United States Patent
Oicherman et al.

(10) Patent No.: US 8,761,505 B2
(45) Date of Patent: Jun. 24, 2014

(54) MODIFICATION OF MEMORY COLORS IN DIGITAL IMAGES

(75) Inventors: Boris Oicherman, Kiriat Tivon (IL); Carl Staelin, Haifa (IL); Hila Nachlieli, Haifa (IL); Ruth Bergman, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 369 days.

(21) Appl. No.: 13/131,204

(22) PCT Filed: Nov. 25, 2008

(86) PCT No.: PCT/US2008/084627
§ 371 (c)(1),
(2), (4) Date: May 25, 2011

(87) PCT Pub. No.: WO2010/062284
PCT Pub. Date: Jun. 3, 2010

(65) Prior Publication Data
US 2011/0222765 A1  Sep. 15, 2011

(51) Int. Cl.
*G06K 9/00* (2006.01)
*G06K 9/40* (2006.01)

(52) U.S. Cl.
USPC .......................... 382/167; 382/274

(58) Field of Classification Search
CPC ................................................... H04N 1/628
USPC .................................................. 382/167, 274
See application file for complete search history.

(56) References Cited

U.S. PATENT DOCUMENTS

| | | | |
|---|---|---|---|
| 5,384,601 A | 1/1995 | Yamashita et al. | |
| 7,634,108 B2 * | 12/2009 | Cohen et al. | 382/103 |
| 2004/0156544 A1 * | 8/2004 | Kajihara | 382/167 |
| 2006/0013478 A1 * | 1/2006 | Ito et al. | 382/167 |
| 2006/0176400 A1 * | 8/2006 | Shimizu | 348/570 |
| 2006/0222242 A1 * | 10/2006 | Hayaishi | 382/167 |
| 2007/0031032 A1 | 2/2007 | Oh et al. | |

FOREIGN PATENT DOCUMENTS

| | | |
|---|---|---|
| EP | 1538848 | 6/2005 |
| JP | 06-078320 | 3/1994 |
| JP | 2007-005977 | 1/2007 |
| KR | 10-2006-0114856 | 11/2006 |

OTHER PUBLICATIONS

Bartleson, C.J. & Bray CP. On the preferred reproduction of flesh, blue-sky and green-grass colours. Photographic Science and Engineering (1962) 6: pp. 19-25.

Hunt, R.W.G. The preferred reproduction of blue sky, green grass and caucasian skin in colour photography. The Journal of Photographic Science (1974) 22: pp. 144-149.

Bodrogi, P. & Tarczali T. Colour memory for various sky, skin, and plant colours: effect of the image context. Colour Research and Application (2001) 26(4): pp. 278-289.

(Continued)

*Primary Examiner* — Yubin Hung

(57) ABSTRACT

Modification of a digital image includes determining a likelihood of a pixel belonging to a memory color region (110). The memory color region has a preferred color. The modification further includes shifting original color of the pixel toward the preferred color (120). The original color is shifted by an amount that is a function of the likelihood and that is generally less than the difference between the original and preferred colors.

12 Claims, 3 Drawing Sheets

(56) References Cited

OTHER PUBLICATIONS

Yamamoto, M., Lim Y, Wei X, Inui M & Kobayashi H. On the preferred flesh colour in japan, china and south corea. Imajing Science Journal (2003) 51(3): pp. 163-174.
Fernandez, Scott R., Fairchild MD & Braun K. Analysis of observer and cultural variability while generating "preferred" colour reproductions of pictorial images. Journal of Imaging Science and Technology (2005) 49(1): pp. 96-104.
Yendrichovsij S.N., Blommaert FJJ & de Ridder H. Colour reproduction and the naturalness constraint. Colour Research and Application (1999) 24(1): pp. 52-67.
Boust, Clotilde, Brettel H, Viénot F, Berche S & Alquié G. Colour enhancement of digital images by experts and preference judgements by observers. Journal of Imaging Science and Technology (2006) 50(1): pp. 1-11.
Luo M.R., Cui G & Rigg B. The development of the cie 2000 colour-difference formula: ciede2000. Colour research and application. (2001) 26: pp. 340-350.
Color-Science Intelligent Image Enhancement technology. Oct. 6, 2008 <http://www.colour-science.com/technology/i2e.htm>.
Color-Science Automatic Image Segmentation technology. Oct. 6, 2008 <http://www.colour-science.com/technology/image%20segmentation.htm>.
Yendrikhovskij S. N., F.J.J Blommaert, H. de Ridder. Representation of Memory Prototype for an Object Color. (1999): 24(6): pp. 393-410.
Yendrikhovskij S. N., FJJ Blommaert, H. de Ridder.Color Reproduction and the Naturalness Constraint. (1998) 24: pp. 52-67.
Supplementary European Search Report dated Mar. 14, 2012 for European patent application 08878498.8.
International Search Report and The Written Opinion of the International Searching Authority; International application No. PCT/US2008/084627; International Filing Date: Nov. 25, 2008.

\* cited by examiner

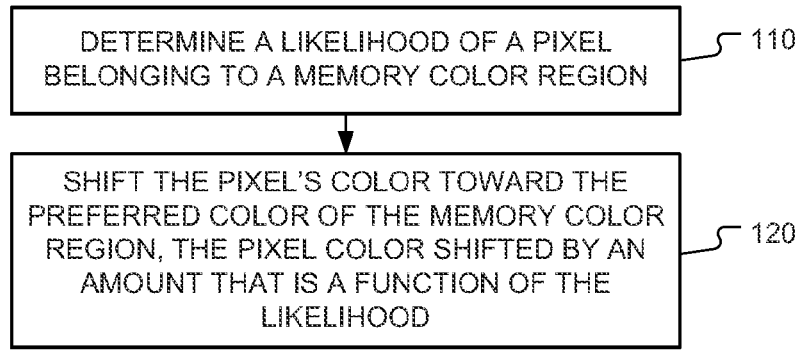
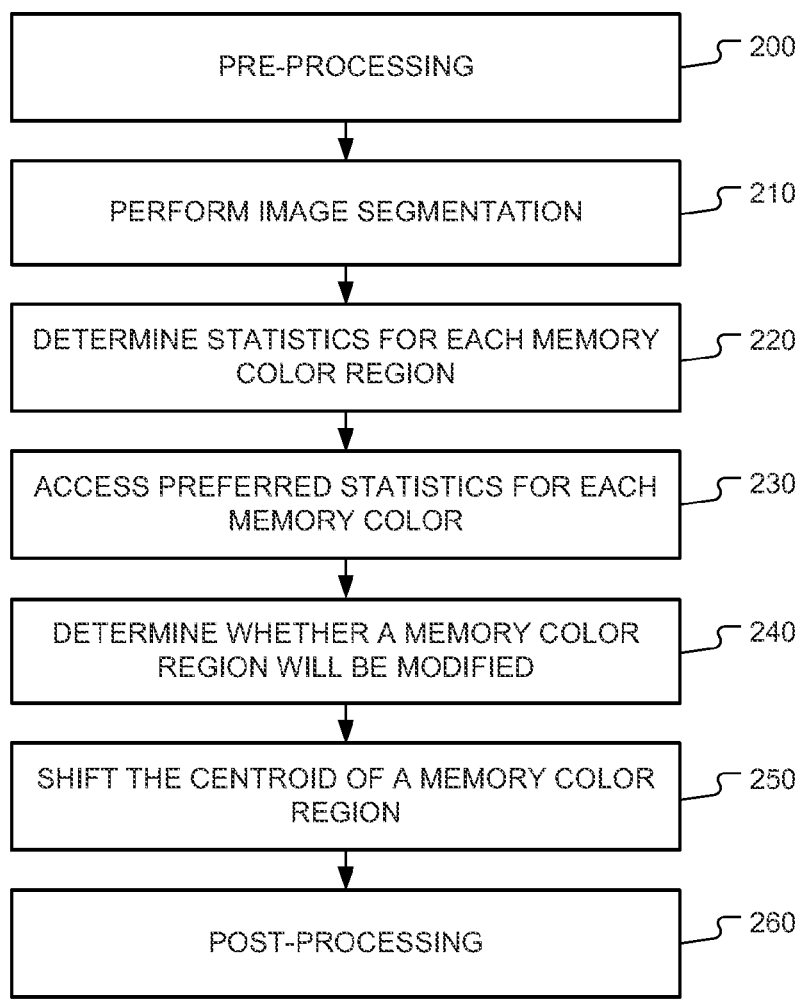

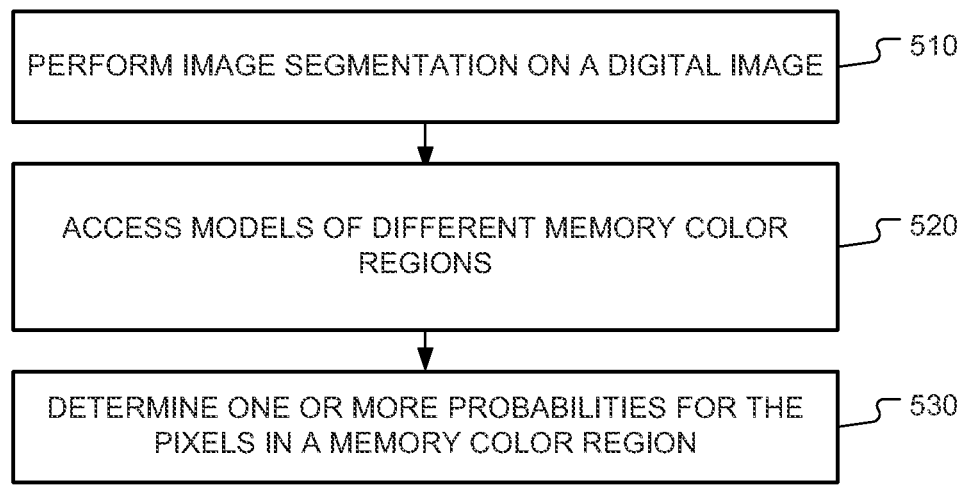
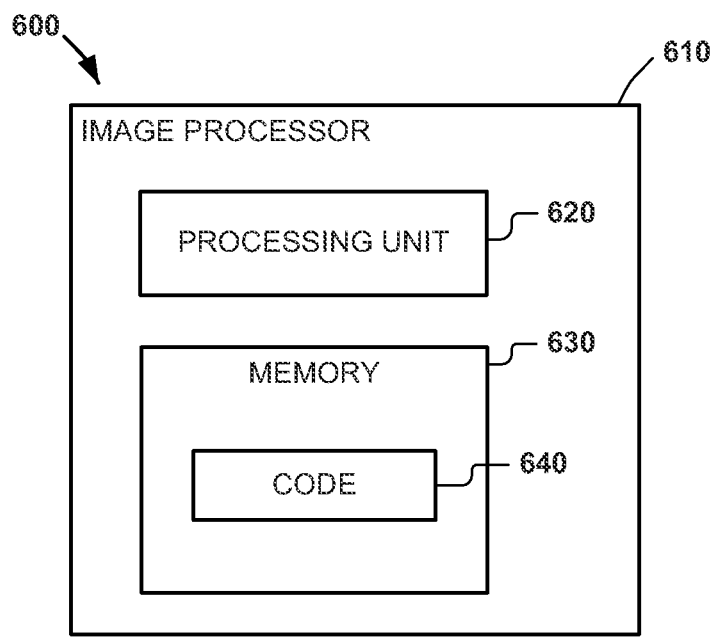

MODIFICATION OF MEMORY COLORS IN DIGITAL IMAGES

CLAIM FOR PRIORITY

The present application is a national stage filing under 35 U.S.C 371 of PCT application number PCT/US2008/084627, having an international filing date of Nov. 25, 2008, which is incorporated by reference in its entirety.

BACKGROUND

People have preferences and expectations regarding the appearance of certain objects in images. For instance, studies have shown that people prefer the reproduced sky to be more saturated than the real one, and the skin and the grass to be yellower than the real ones.

The colors of skin, sky and foliage are examples of "memory colors." A memory color refers to the color of a familiar object. An observer chooses to match the color of a familiar object to his or her memory of the color rather than the actual color. Sky, skin and foliage are very familiar objects in an image.

The reproduction of memory colors might be unsatisfactory due to imperfections in digital images and the capture, color processing, and display of digital images. For instance, white balancing by a digital camera might produce memory colors that appear unpleasant.

Even if the memory colors are captured and reproduced accurately, they still might appear unpleasant. For instance, a digital camera accurately captures a grayish-blue sky, and a photo printer accurately reproduces the sky, but the sky still appears unpleasant.

Memory color enhancement is performed on digital images to modify the colors of familiar objects so they appear more familiar and pleasant. These objects are typically identified by image segmentation, and their colors are modified independently of each other. The color of vegetation might be modified to a more pleasant green. Skin color might be modified to appear warmer and more natural. The color of the sky might be modified to a deeper blue.

Although memory color enhancement might produce more pleasant colors for certain objects in the image, it does not necessarily produce a better looking image overall.

SUMMARY

According to one aspect of the present invention, modification of a digital image includes determining a likelihood of a pixel belonging to a memory color region. The memory color region has a preferred color. The modification further includes shifting original color of the pixel toward the preferred color. The original color is shifted by an amount that is a function of the likelihood and that is generally less than the difference between the original and preferred colors According to another aspect of the present invention, an image processing system comprises a processing unit and memory encoded with code for causing the processing unit to perform image segmentation on an image. The image segmentation identifies any memory color regions in the image, and color centroids of the regions are shifted, if necessary. The shifting of a color centroid of a memory region includes nudging original colors of the pixels toward a preferred color of the memory color region. The original color of a pixel is nudged as a function of a likelihood of the pixel belonging to the memory color region.

According to still another aspect of the present invention, an article comprises memory encoded with code for causing a processing unit to enhance a digital image by partially shifting color centroids of memory color regions toward preferred colors. The partial shifting of a pixel's color in the memory color region includes determining a likelihood of the pixel belonging to the memory color region, and shifting the pixel's original color toward the preferred color by an amount that is a function of the likelihood.

BRIEF DESCRIPTION OF THE DRAWINGS

FIG. 1 is an illustration of a method of performing memory color modification in accordance with an embodiment of the present invention.

FIG. 2 is an illustration of a method of performing image enhancement in accordance with an embodiment of the present invention.

FIG. 5 is an illustration of a method of determining soft probabilities of pixels belonging to a color memory region.

FIG. 6 is an illustration of an image processing system in accordance with an embodiment of the present invention.

DETAILED DESCRIPTION

Figure 3:
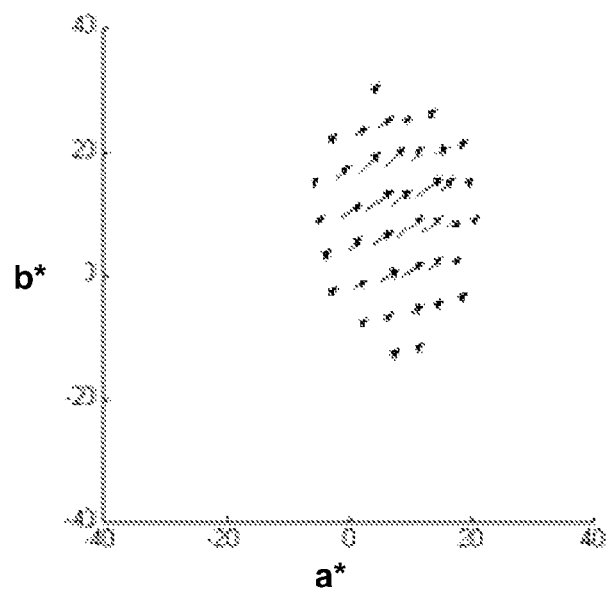
FIGS. 3-4 are illustrations of memory color modification in accordance with embodiments of the present invention.

As shown in the drawings for purposes of illustration, the present invention is embodied in the modification of memory colors in a digital image. Colors of skin, foliage and sky are traditionally considered to be most important, and they will be used in examples below. However, memory color modification is not limited to these three objects. Memory color modification can be performed on any other identifiable object having a preferred color.

The memory colors may be established by conducting a psychophysical experiment, or from published psychophysical data for identification of preferred reproduction. Parameters of memory color models may be learned from a large corpus of tagged images (i.e., tagged by people). For example, all pixels depicting an object are collected from a large number of images, and a memory color model (e.g., a Gaussian distribution) is established.

Reference is made to FIG. 1, which illustrates a method of modifying the memory color of a region in a digital image. The region might represent sky, skin, foliage, or some other familiar object.

At block 110, a likelihood of a pixel belonging to a memory color region is determined. In some embodiments, the likelihood is a probability of the pixel belonging to the memory color region.

In some embodiments, the probability may be determined by comparing a pixel value to a memory color distribution. For example, a memory color distribution for grass may be represented in Lch as a Gaussian distribution with mean [138.42,43.64,87,85] and standard deviation of [59.43,19.32, 9.05]. If a pixel has a color of [130, 40, 80], that distribution can be used to determine the probability of the pixel belonging to a grass region.

In some embodiments, the probability may be determined in conjunction with an image segmentation algorithm. During image segmentation, the algorithm generates a mask identifying those pixels that belong to a certain memory color region. For instance, a mask might identify those pixels belonging to the sky. The mask may indicate a hard probability $P_{object}=[0,1]$ as to whether a pixel in the image belongs to the color memory area, or it may indicate a soft probability $[0 \leq P_{object} \leq 1]$ for each pixel.

A likelihood is not limited to a probability. In some embodiments, a likelihood may be computed by a function that gives some segmentation or separation between memory color regions and non-memory color regions. For example, a gamma function of the probabilities may be used.

At block 120, original color of the pixel is shifted toward the preferred color. The original color is shifted by an amount that is a function of the likelihood (several examples of computing the shift are provided below). The original color is not replaced with the memory color. Instead, the amount of the shift is generally less than the difference between the original and preferred colors. Preferably, the original color is "nudged" towards the preferred color.

The functions at blocks 110-120 may be performed on each pixel in the memory color region. The functions at blocks 110 and 120 may be repeated for additional memory color regions in the image.

As a result of shifting the pixel values in a memory color region, the centroid of the color (that is, the average value of the color of the region) is shifted. In some embodiments, pixel values in a memory color region are shifted only if the shift is needed. Otherwise, the pixel values are not shifted. For instance, if the original mean a* and b* values in CIELAB space are within a threshold of the preferred a* and b* values, then color of the area is not shifted. In some embodiments, one color channel could be shifted without shifting the other color channel.

Because memory color shifts are made only where needed, and because the shifts are generally mere nudges, the method produces a better looking image than a method that provides full memory color correction of objects independently of each other.

The reason for nudging the colors (as opposed to performing a large or full correction) is based in part on context. Consider an image where all colors are skewed due to poor white balance, unusual lighting, or other causes. Changing the memory colors of objects such as skin, while leaving the rest of the image untouched, can result in those memory colors looking "out of place" or unnatural with respect to the rest of the image. That is, the content tends to look "wrong" as its color balance doesn't match that of its surroundings. Thus, even if a modified memory color is out of context, the context won't be too obvious because the change is small.

Nudging the color (as opposed to performing full color correction) offers other advantages. Because changes are small, the enhanced objects still "fit" in a scene. Yet another advantage is that the color enhancement may be completely automated.

The shift may be in the direction of the preferred color. The direction can be expressed in Euclidean coordinates or polar coordinates. Hue rotations are preferably handled in polar coordinates. For non-neutral (gray) colors, the human visual system is more sensitive to changes in hue (angle in polar coordinates) than changes in saturation (magnitude in polar coordinates). Thus, polar coordinates may be better if hue rotations are more "disturbing" than chroma enhancements.

Reference is now made to FIG. 2, which illustrates a method of enhancing a digital image. The image is represented in an approximately-uniform color domain, such as CIELAB. Let $a^*_{orig}$ and $b^*_{orig}$ represent the color coordinates of a pixel in the original image.

At block 210, image segmentation is performed on the digital image. An object detection algorithm may be used to produce N-channel masks corresponding to different familiar objects in the image (e.g., skin, face, foliage). An N-channel mask may contain values that correspond to the pixels in the original image. Each mask value is proportional to the probability that its corresponding image pixel belongs to a memory color region. Thus, a sky mask will indicate the probability of each pixel in the original image being part of sky, while a skin mask will indicate the probability of each pixel in the original image being part of skin, and so on. Examples of masks include, but are not limited to, red eye masks, skin masks, shadow masks, vegetation masks, sky masks, and edge masks. These masks are typically used to compute color casts or to locally enhance an image.

At block 220, statistics are determined for each memory color region in the original image. For example, the statistics include the mean of all $a^*_{orig}$ and the means of all $b^*_{orig}$ in a memory color region. Let $\bar{a}^*_{orig}$ and $\bar{b}^*_{orig}$ represent the mean a* and b* coordinates in a memory color region, as indicated by the object detection algorithm.

At block 230, statistics for the preferred mean values of a* and b* in the memory color region are accessed. Let $\bar{a}^*_{pref}$ and $\bar{b}^*_{pref}$ represent the mean preferred reproduction of the memory color in the plane of constant L* in CIELAB space.

At block 240, it is determined whether a memory color region will be modified. The memory color region may be modified If, for example, the quantity $(\bar{a}^*_{pref}-\bar{a}^*_{orig})$ exceeds a threshold. This is an example of a "hard" decision. In some embodiments, a threshold function may be used to make a "soft" decision in that the amount of enhancement is modified as a function of the distance between the preferred and original colors.

At block 250, the centroid of the memory color region is shifted. The shift may be performed by modifying the value of each pixel in the memory color region. A value $a^*_{new}$ may be computed as a function of $a^*_{org}$, $\bar{a}^*_{org}$, $\bar{a}^*_{ref}$, and $P_{object}^\gamma$, where $P_{object}$ is the probability of the pixel belonging to the memory color region, and γ is an exponent. Exponent γ>1 results in smaller $a^*_{new}$ values for all non-unity $P_{object}$ and thereby controls the extent to which colors with a probability $P_{object}<1$ are corrected. The exponent γ may have the same value for all objects, or it may have a per-object value (e.g., $\gamma_{grass}$, $\gamma_{sky}$, $\gamma_{skin}$).

A method herein is not limited to any particular equation for computing $a^*_{new}$ and $b^*_{new}$. Examples of equations include but are not limited to the following.

As a first example, $$a^*_{new} = a^*_{orig} + \Delta_a \cdot \frac{P_{feature}^\gamma}{kS_C S_H}$$

where Δa is computed as $(\bar{a}^*_{ref}-\bar{a}^*_{orig})$, k is a "strength" constant that controls the magnitude of color modification (varying the strength constant changes the amount of enhancement), and $S_C$ and $S_H$ compensate for the non-uniformity of the color space, i.e., similar magnitude shifts might have different perceptual effect depending on their direction in the color space, by weighting the color according to the location of the original color in the a*b* plane. In a perfectly uniform color domain these weightings will be equal to 1.

The value $\Delta_a$ may be characterized as the initial shift that is required to move the original value a* of a pixel towards the preferred reproduction color. This initial shift is reduced by the probability of the pixel belonging to the memory color region.

A modified value for $b^*_{new}$ may be computed in a similar manner.

As a second example, $$a^*_{new} = (1-P_{object}^\gamma)a^*_{orig} + P_{object}^\gamma \Delta_a; \text{ and}$$

$$b^*_{new} = (1-P_{object}^\gamma)b^*_{orig} + P_{object}^\gamma \Delta_b.$$

In other examples, an initial shift need not be computed in an intermediate step. In some examples, the original shift may be computed directly.

A method according to an embodiment of the present invention is not limited to nudging the original color towards the preferred color. In some embodiments, the shift may be greater than a nudge. Consider a third example, in which a linear mix of the original values with the modified values may be expressed as $$a^*_{new}(1-P_{object}^\gamma)a^*_{orig} + P_{object}^\gamma a^*_{enhanced}$$

$$b^*_{new}(1-P_{object}^\gamma)b^*_{orig} + P_{object}^\gamma b^*_{enhanced}$$

where $a^*_{enhanced}$ and $b^*_{enhanced}$ are nudged values. Thus, so long as $P_{object}^\gamma < 1$, only a partial memory color correction will be performed. In this embodiment, full color correction is performed if it is certain (i.e., $P_{object}^\gamma = 1$) that a pixel belongs to a memory color region; and partial correction is performed if less than certain (i.e., $P_{object}^\gamma < 1$).

A method according to an embodiment of the present invention is not limited a particular color space. CIELAB is but one example. Other color spaces that have a lightness channel and two color channels may be used. Examples of such color spaces include, but are not limited to CIECAM97, CIECAM02, Lhs, $YC_bC_r$, and YUV. The choice of a color space may depend on the psychometric "quality" or linearity of the color space.

Pre-processing (block 205) may be performed on the digital image prior to memory color modification, and post-processing (block 260) may be performed on the digital image after memory colors have been modified. Examples of pre-processing might include noise estimation and processing that improves segmentation. Pre-processing might also include smoothing the masks that result from image segmentation. A mask may be smoothed to retain details and to make it less likely to introduce pixelization or posterization into the image.

Figure 4:
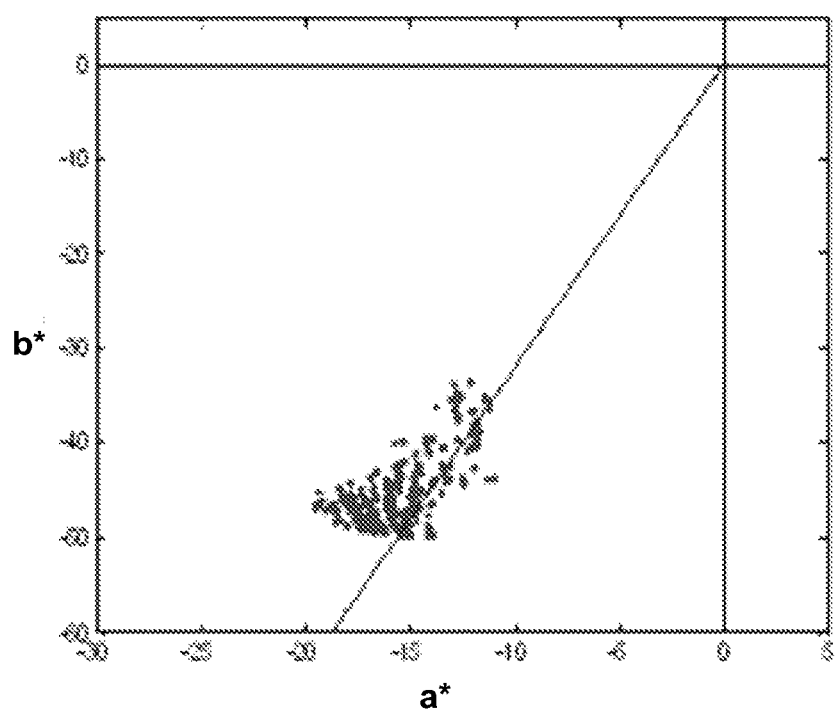

Reference is now made to FIGS. 3-4, which provide illustrations of color modifications of skin and sky. FIG. 3 shows an example of the result of skin tone modification. An arrow plot (in the a*b* plane) shows the modification applied to the memory color region. The beginning of an arrow represents the original image color, and the arrow head represents the modified color. The length of an arrow is proportional to the magnitude of the modification. The "cloud" of arrows represents the memory color region. The modification is strongest at the center of the region and weaker at the edges. There is no modification outside of the memory color region. For example, if the original skin is bluish and lacking chrome, the modification moves the a* and b* values of skin tone pixels towards higher a* and b* ("making them more "orange"), and away from the origin. The modified skin color is distinctly "warmer" and more pleasant.

FIG. 4 shows an example of the result of sky modification. This figure shows the line of preferred sky hue and the scatter of original pixel values in the sky region of image. Sky color is not uniform; it is deep blue in a direction orthogonal to the sun, and tends towards neutral near the horizon. Representation of the preferred sky colors in CIELAB space is very complex: the sky colors fail in the blue region where this color space has the well-known "hue inconstancy" problem whereby perceptually similar hues lie on different hue angles in CIELAB. The problem is solved by performing the modifications in CIECAM02 space. The preferred reproduction is represented by a set of values lying on the line of constant "preferred" sky hue, rather than being a scatter of points around the color center. Hence, the values of $\Delta_a$ and $\Delta_b$ represent the distance between the image pixel color and the straight line of constant "preferred" hue in CIECAM02 space.

Reference is made to FIG. 5, which illustrates a method of determining soft probabilities of pixels belonging to a memory color region. At block 510, a digital image is segmented into familiar objects. Image segmentation is not limited to any particular technique. Examples of image segmentation techniques include, but are not limited to, template matching, normalized correlation, and eigenspace decomposition. The image segmentation produces memory color regions corresponding to familiar objects.

At block 520, models of the different color memory regions are accessed. Each model may include one or more features of its corresponding object. Features include, but are not limited to color and texture.

In some embodiments, a Gaussian model may be used to represent memory colors. Consider a memory color distribution that is represented in Lch space by a center and a standard deviation for each channel. The memory color of grass may be represented in Lch as a Gaussian distribution with mean [138.42,43.64,87.85] and standard deviation [59.43,19.32, 9.05]; the memory color of sky may be represented in Lch as a Gaussian distribution with mean [179.21,32.82,183.97] and standard deviation [30.40,13.72,15.73]; and the memory color of skin may be represented in Lch as a Gaussian distribution with mean [181.23,31.95,34.22] and standard deviation [29.92,11.17,7.81]; where L, c and h are each in the range [0, 255].

The memory color modification may ignore the lightness channel, since lightness can vary widely in a familiar object such as skin. However, the color channel may be modeled as narrow Gaussian and modified in the plane of constant L.

A pixel might have a probability of belonging to more than one memory color region. For example, if skin tones are very bluish due to white balance, shadows, they can overlap with sky tones.

The memory color distribution may also take texture into account. To account for texture, an LCHT model may be used, where T represents some texture related feature (e.g., local standard deviation).

In some embodiments, a memory color distribution may be represented by an ellipsoid in a color space. In other embodiments, a memory color distribution may be represented by a point or other shape (e.g., rectangle, parallelogram, approximation of an ellipsoid). In general, however, ellipsoids capture the shape of the memory color distribution well.

At block 530, one or more probabilities for the pixels in a memory color region are determined. In some embodiments, a local probability can be determined by directly using the memory color distribution for that region. For example, a Gaussian distribution for grass in Lch has a mean of [138.42, 43.64,87.85] and a standard deviation of [59.43,19.32,9.05]. Each pixel is compared to the distribution to determine the probability of belonging to grass.

In other embodiments, a global probability is determined for a memory color region. That single probability is used for each pixel in the region.

In still other embodiments, a local probability is determined by a cascade of classification stages. Each classification stage performs a binary discrimination function that classifies a candidate image patch (x-y location and scale) as either being part of an object or not being part of the object.

Different classification stages may use different discrimination thresholds or criteria. Results of the different stages are compiled to generate a probability for each pixel in the region. See, for example, assignee's U.S. Pat. No. 7,099,510.

A method according to an embodiment of the present invention is device-independent. It can be implemented in a system that performs image enhancement. Examples of such systems include, without limitation, printing devices (e.g., inkjet printers, photo printers), imaging devices (e.g., digital cameras, film scanners), display devices (e.g., digital televisions), digital minilabs and kiosks, computers (e.g., imaging software, photo album software, and print drivers in desktops, laptops, workstations), and servers (e.g., photo-sharing web sites).

Reference is made to FIG. 6, which illustrates a system 600 for processing digital images. The system 600 includes an image processor 610. The image processor 610 includes a processing unit 620 and memory 630. Code 640 encoded in the memory 630 is executed by the processing unit 620 to enhance digital images in accordance with the present invention. The code 640 can have the form of a standalone program, a plug-in, a device driver, an ICC profile, etc. The memory 630 can be programmed as software (e.g., in computer-readable memory of a general purpose computer) or firmware (e.g., in a field programmable gate array of a digital camera). In some embodiments, the code could be implemented in hardware as an application specific integrated circuit (ASIC).

The system 600 can automatically perform memory color modification. No manual intervention is needed. Although the system 600 could be adapted to allow manual intervention, manual intervention is impractical for a system 600 that enhances very large numbers of images.

The invention claimed is:

1. A method of modifying a digital image, the method comprising:
    determining a likelihood of a pixel belonging to a memory color region, the pixel having an original color and the memory color region having a preferred color that is based upon psychophysical data; and
    shifting the original color of the pixel toward the preferred color by an amount, wherein the amount of the shift is a function of $P_{object}^{\gamma}$, wherein $P_{object}$ is the determined likelihood of the pixel belonging to the memory color region, and $\gamma$ is an exponent, and $\gamma>1$, and the amount of the shift is less than the difference between the original and preferred colors.

2. The method of claim 1, wherein the pixel is nudged toward the preferred color.

3. The method of claim 1, wherein the likelihood of the pixel belonging to the memory region is a probability of the pixel belonging to a memory color region.

4. The method of claim 1, wherein the original color of the pixel is shifted only if necessary.

5. The method of claim 1, wherein lightness of the pixel is not shifted, and at least one color channel is shifted.

6. The method of claim 1, wherein the amount of the shift is a function of an initial shift that is reduced as a function of a probability, wherein the initial shift is less than the difference between the original and preferred colors.

7. The method of claim 1, wherein the exponent $\gamma$ is object-specific.

8. The method of claim 1, wherein the likelihood of the pixel belonging to the memory region is determined by comparing the pixel to a memory color model.

9. The method of claim 1, wherein the likelihood of the pixel belonging to the memory region is a soft probability.

10. An image processing system comprising a processing unit and memory encoded with code for causing the processing unit to:
    perform image segmentation on an image, the image segmentation identifying a memory color region in the image;
    shift a color centroid of the memory color region by nudging original colors of pixels in the memory color region toward a preferred color, wherein an amount of the nudge is a function of $P_{object}^{\gamma}$, wherein $P_{object}$ is a determined likelihood of a pixel belonging to the memory color region, and $\gamma$ is an exponent, and $\gamma>1$, and wherein the preferred color is based upon psychophysical data.

11. A non-transitory computer readable storage medium storing machine-readable instructions that when executed by a processor, cause the processor to:
    enhance a digital image by partially shifting color centroids of memory color regions toward preferred colors that are based upon psychophysical data, wherein the partial shifting of a pixel's color in a memory region includes determining a likelihood of the pixel belonging to the memory color region, and
    shift the pixel's original color toward the preferred color by an amount, wherein the amount of the shift is a function of $P_{object}^{\gamma}$, wherein $P_{object}$ is the determined likelihood of the pixel belonging to the memory color region, and $\gamma$ is an exponent, and $\gamma>1$.

12. A non-transitory computer readable storage medium storing machine-readable instructions that when executed by a processor, cause the processor to:
    determine a likelihood of a pixel belonging to a memory color region, the pixel having an original color and the memory color region having a preferred color that is based upon psychophysical data; and
    shift the original color of the pixel toward the preferred color by an amount, wherein the amount of the shift is a function of $P_{object}^{\gamma}$, wherein $P_{object}$ is the determined likelihood of the pixel belonging to the memory color region, and $\gamma$ is an exponent, and $\gamma>1$, and the amount of the shift is less than the difference between the original and preferred colors.

* * * * *